US011741071B1

(12) United States Patent
Rolnik et al.

(10) Patent No.: US 11,741,071 B1
(45) Date of Patent: Aug. 29, 2023

(54) DIGITAL PROCESSING SYSTEMS AND METHODS FOR NAVIGATING AND VIEWING DISPLAYED CONTENT

(71) Applicant: Monday.com LTD., Tel Aviv (IL)

(72) Inventors: Natan Rolnik, Modiin (IL); Shani Frankel, Tel Aviv (IL); Or May Paz, Shoham (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 18/147,337

(22) Filed: Dec. 28, 2022

(51) Int. Cl.
*G06F 16/22* (2019.01)
*G06F 3/0485* (2022.01)

(52) U.S. Cl.
CPC ........ *G06F 16/2282* (2019.01); *G06F 3/0485* (2013.01)

(58) Field of Classification Search
CPC ........................... G06F 3/0485; G06F 16/2282
See application file for complete search history.

(56) References Cited

U.S. PATENT DOCUMENTS

| | | | |
|---|---|---|---|
| 4,972,314 | A | 11/1990 | Getzinger et al. |
| 5,220,657 | A | 6/1993 | Bly et al. |
| 5,479,602 | A | 12/1995 | Baecker et al. |
| 5,517,663 | A | 5/1996 | Kahn |
| 5,632,009 | A | 5/1997 | Rao et al. |
| 5,682,469 | A | 10/1997 | Linnett et al. |
| 5,696,702 | A | 12/1997 | Skinner et al. |
| 5,726,701 | A | 3/1998 | Needham |
| 5,787,411 | A | 7/1998 | Groff et al. |
| 5,880,742 | A | 3/1999 | Rao et al. |
| 5,933,145 | A | 8/1999 | Meek |
| 6,016,438 | A | 1/2000 | Wakayama |

(Continued)

FOREIGN PATENT DOCUMENTS

| | | | |
|---|---|---|---|
| CA | 2828011 | A1 | 9/2012 |
| CN | 103064833 | A | 4/2013 |

(Continued)

OTHER PUBLICATIONS

D'Elessio et al., Monday.com Walkthrough 2018\All Features, Platforms & Thoughts, Mar. 1, 2018, pp. 1-55, 2018.

(Continued)

*Primary Examiner* — Eliyah S. Harper
(74) *Attorney, Agent, or Firm* — FINNEGAN, HENDERSON, FARABOW, GARRETT & DUNNER, LLP

(57) ABSTRACT

System and methods are provided for performing table navigation operations on a display, wherein the table comprises rows and columns and at least one cell that contains more information than presented on the display. Disclosed embodiments include receiving a scroll signal for scrolling the table, wherein the scroll signal results from a motion of a user on the display; in response to a vertical component in the motion, causing the table to scroll vertically; in response to a horizontal component in the motion, causing the table to scroll horizontally; receiving an enhancing scroll signal resulting from an enhancing motion for revealing hidden information within the at least one cell on the table; and in response to the enhancing scroll signal, revealing at least a portion of the hidden information within the at least one cell.

20 Claims, 6 Drawing Sheets

(56) References Cited

U.S. PATENT DOCUMENTS 6,016,553 A 1/2000 Schneider et al.
6,023,695 A 2/2000 Osborn et al.
6,034,681 A 3/2000 Miller et al.
6,049,622 A 4/2000 Robb et al.
6,088,707 A 7/2000 Bates et al.
6,108,573 A 8/2000 Debbins et al.
6,111,573 A 8/2000 McComb et al.
6,167,405 A 12/2000 Rosensteel, Jr. et al.
6,169,534 B1 1/2001 Raffel et al.
6,182,127 B1 1/2001 Cronin, III et al.
6,185,582 B1 2/2001 Zellweger et al.
6,195,794 B1 2/2001 Buxton
6,266,067 B1 7/2001 Owen et al.
6,275,809 B1 8/2001 Tamaki et al.
6,330,022 B1 12/2001 Seligmann
6,377,965 B1 4/2002 Hachamovitch et al.
6,385,617 B1 5/2002 Malik
6,460,043 B1 10/2002 Tabbara et al.
6,496,832 B2 12/2002 Chi et al.
6,509,912 B1 1/2003 Moran et al.
6,510,459 B2 1/2003 Cronin, III et al.
6,522,347 B1 2/2003 Tsuji et al.
6,527,556 B1 3/2003 Koskinen
6,567,830 B1 5/2003 Madduri
6,606,740 B1 8/2003 Lynn et al.
6,636,242 B2 10/2003 Bowman-Amuah
6,647,370 B1 11/2003 Fu et al.
6,661,431 B1 12/2003 Stuart et al.
6,988,248 B1 1/2006 Tang et al.
7,027,997 B1 4/2006 Robinson et al.
7,034,860 B2 4/2006 Lia et al.
7,043,529 B1 5/2006 Simonoff
7,054,891 B2 5/2006 Cole
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,383,320 B1 6/2008 Silberstein et al.
7,389,473 B1 6/2008 Sawicki et al.
7,415,664 B2 8/2008 Aureglia et al.
7,417,644 B2 8/2008 Cooper et al.
7,461,077 B1 12/2008 Greenwood
7,489,976 B2 2/2009 Adra
7,617,443 B2 11/2009 Mills et al.
7,685,152 B2 3/2010 Chivukula et al.
7,707,514 B2 4/2010 Forstall et al.
7,710,290 B2 5/2010 Johnson
7,770,100 B2 8/2010 Chamberlain et al.
7,827,476 B1 11/2010 Roberts et al.
7,827,615 B1 11/2010 Allababidi et al.
7,916,157 B1 3/2011 Kelley et al.
7,921,360 B1 4/2011 Sundermeyer et al.
7,933,952 B2 4/2011 Parker et al.
7,954,064 B2 5/2011 Forstall et al.
8,046,703 B2 10/2011 Busch et al.
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,407,217 B1 3/2013 Zhang
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater, Jr.
8,635,520 B2 1/2014 Christiansen et al.
8,677,448 B1 3/2014 Kauffman et al.
8,738,414 B1 5/2014 Nagar et al.
8,812,471 B2 8/2014 Akita
8,819,042 B2 8/2014 Samudrala et al.
8,825,758 B2 9/2014 Bailor et al.
8,838,533 B2 9/2014 Kwiatkowski et al.
8,862,979 B2 10/2014 Hawking
8,863,022 B2 10/2014 Rhodes et al.
8,869,027 B2 10/2014 Louch et al.
8,937,627 B1 1/2015 Otero et al.
8,938,465 B2 * 1/2015 Messer .................. G06F 40/40 704/7
8,954,871 B2 * 2/2015 Louch ................ G06F 3/04842 715/764
9,007,405 B1 * 4/2015 Eldar ................. G06F 16/9577 345/666
9,015,716 B2 4/2015 Fletcher et al.
9,026,897 B2 5/2015 Zarras
9,043,362 B2 5/2015 Weissman et al.
9,063,958 B2 6/2015 Müller et al.
9,129,234 B2 9/2015 Campbell et al.
9,159,246 B2 10/2015 Rodriguez et al.
9,172,738 B1 10/2015 daCosta
9,183,303 B1 11/2015 Goel et al.
9,223,770 B1 12/2015 Ledet
9,239,719 B1 1/2016 Feinstein et al.
9,244,917 B1 1/2016 Sharma et al.
9,253,130 B2 2/2016 Zaveri
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,390,059 B1 7/2016 Gur et al.
9,424,287 B2 8/2016 Schroth
9,424,333 B1 8/2016 Bisignani et al.
9,424,545 B1 8/2016 Lee
9,430,458 B2 8/2016 Rhee et al.
9,449,031 B2 9/2016 Barrus et al.
9,495,386 B2 11/2016 Tapley et al.
9,519,699 B1 12/2016 Kulkarni et al.
9,558,172 B2 1/2017 Rampson et al.
9,613,086 B1 * 4/2017 Sherman ............... G06F 16/248
9,635,091 B1 * 4/2017 Laukkanen ........... G06F 3/1423
9,679,456 B2 6/2017 East
9,727,376 B1 8/2017 Bills et al.
9,760,271 B2 * 9/2017 Persaud ................ G06F 40/106
9,794,256 B2 * 10/2017 Kiang .................. H04L 67/535
9,798,829 B1 10/2017 Baisley
9,811,676 B1 11/2017 Gauvin
9,866,561 B2 1/2018 Psenka et al.
9,870,136 B2 1/2018 Pourshahid
10,043,296 B2 8/2018 Li
10,067,928 B1 9/2018 Krappe
10,078,668 B1 9/2018 Woodrow et al.
10,169,306 B2 1/2019 O'Shaughnessy et al.
10,176,154 B2 1/2019 Ben-Aharon et al.
10,235,441 B1 3/2019 Makhlin et al.
10,255,609 B2 4/2019 Kinkead et al.
10,282,405 B1 5/2019 Silk et al.
10,282,406 B2 5/2019 Bissantz
10,311,080 B2 6/2019 Folting et al.
10,318,624 B1 6/2019 Rosner et al.
10,327,712 B2 6/2019 Beymer et al.
10,347,017 B2 7/2019 Ruble et al.
10,372,706 B2 8/2019 Chavan et al.
10,380,140 B2 8/2019 Sherman
10,423,758 B2 9/2019 Kido et al.
10,445,702 B1 10/2019 Hunt
10,452,360 B1 10/2019 Burman et al.
10,453,118 B2 10/2019 Smith et al.
10,474,317 B2 11/2019 Ramanathan et al.
10,489,391 B1 11/2019 Tomlin
10,489,462 B1 11/2019 Rogynskyy et al.

(56) References Cited

U.S. PATENT DOCUMENTS 10,496,737 B1 12/2019 Sayre et al.
10,505,825 B1 12/2019 Bettaiah et al.
10,528,599 B1 1/2020 Pandis et al.
10,534,507 B1 1/2020 Laukkanen et al.
10,540,152 B1 1/2020 Krishnaswamy et al.
10,540,434 B2 1/2020 Migeon et al.
10,546,001 B1 1/2020 Nguyen et al.
10,564,622 B1 2/2020 Dean et al.
10,573,407 B2 2/2020 Ginsburg
10,579,724 B2 3/2020 Campbell et al.
10,587,714 B1 3/2020 Kulkarni et al.
10,628,002 B1 4/2020 Kang et al.
10,698,594 B2 6/2020 Sanches et al.
10,706,061 B2 7/2020 Sherman et al.
10,719,220 B2 7/2020 Ouellet et al.
10,733,256 B2 8/2020 Fickenscher et al.
10,740,117 B2 8/2020 Ording et al.
10,747,950 B2 8/2020 Dang et al.
10,748,312 B2 8/2020 Ruble et al.
10,754,688 B2 8/2020 Powell
10,761,691 B2 9/2020 Anzures et al.
10,795,555 B2 10/2020 Burke et al.
10,817,660 B2 10/2020 Rampson et al.
D910,077 S 2/2021 Naroshevitch et al.
10,963,578 B2 3/2021 More et al.
11,010,371 B1 5/2021 Slomka et al.
11,030,259 B2 6/2021 Mullins et al.
11,042,363 B1 6/2021 Krishnaswamy et al.
11,042,699 B1 6/2021 Sayre et al.
11,048,714 B2 6/2021 Sherman et al.
11,086,894 B1 8/2021 Srivastava et al.
11,222,167 B2 1/2022 Gehrmann et al.
11,243,688 B1 2/2022 Remy et al.
2001/0008998 A1 7/2001 Tamaki et al.
2001/0032248 A1 10/2001 Krafchin
2001/0039551 A1 11/2001 Saito et al.
2002/0002459 A1 1/2002 Lewis et al.
2002/0065848 A1 5/2002 Walker et al.
2002/0065849 A1 5/2002 Ferguson et al.
2002/0065880 A1 5/2002 Hasegawa et al.
2002/0069207 A1 6/2002 Alexander et al.
2002/0075309 A1 6/2002 Michelman et al.
2002/0082892 A1 6/2002 Raffel et al.
2002/0138528 A1 9/2002 Gong et al.
2003/0033196 A1 2/2003 Tomlin
2003/0041113 A1 2/2003 Larsen
2003/0051377 A1 3/2003 Chirafesi, Jr.
2003/0058277 A1 3/2003 Bowman-Amuah
2003/0065662 A1 4/2003 Cosic
2003/0093408 A1 5/2003 Brown et al.
2003/0101416 A1 5/2003 McInnes et al.
2003/0135558 A1 7/2003 Bellotti et al.
2003/0137536 A1 7/2003 Hugh
2003/0187864 A1 10/2003 McGoveran
2003/0200215 A1 10/2003 Chen et al.
2003/0204490 A1 10/2003 Kasriel
2004/0032432 A1 2/2004 Baynger
2004/0098284 A1 5/2004 Petito et al.
2004/0133441 A1 7/2004 Brady et al.
2004/0138939 A1 7/2004 Theiler
2004/0139400 A1 7/2004 Allam et al.
2004/0162833 A1 8/2004 Jones et al.
2004/0172592 A1 9/2004 Collie et al.
2004/0212615 A1 10/2004 Lithe
2004/0215443 A1 10/2004 Hatton
2004/0230940 A1 11/2004 Cooper et al.
2005/0034058 A1 2/2005 Mills et al.
2005/0034064 A1 2/2005 Meyers et al.
2005/0039001 A1 2/2005 Hudls et al.
2005/0039033 A1 2/2005 Meyers et al.
2005/0044486 A1 2/2005 Kotler et al.
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0091596 A1 4/2005 Anthony et al.
2005/0096973 A1 5/2005 Heyse et al.
2005/0114305 A1 5/2005 Haynes et al.
2005/0125395 A1 6/2005 Boettiger
2005/0165600 A1 7/2005 Kasravi et al.
2005/0171881 A1 8/2005 Ghassemieh et al.
2005/0216830 A1 9/2005 Turner et al.
2005/0228250 A1 10/2005 Bitter et al.
2005/0251021 A1 11/2005 Kaufman et al.
2005/0257204 A1 11/2005 Bryant et al.
2005/0278297 A1 12/2005 Nelson
2005/0289170 A1 12/2005 Brown et al.
2005/0289342 A1 12/2005 Needham et al.
2005/0289453 A1 12/2005 Segal et al.
2006/0009960 A1 1/2006 Valencot et al.
2006/0013462 A1 1/2006 Sadikali
2006/0015499 A1 1/2006 Clissold et al.
2006/0015806 A1 1/2006 Wallace
2006/0031148 A1 2/2006 O'Dell et al.
2006/0031764 A1 2/2006 Keyser et al.
2006/0036568 A1 2/2006 Moore et al.
2006/0047811 A1 3/2006 Lau et al.
2006/0053096 A1 3/2006 Subramanian et al.
2006/0053194 A1 3/2006 Schneider et al.
2006/0069604 A1 3/2006 Leukart et al.
2006/0069635 A1 3/2006 Ram et al.
2006/0080594 A1 4/2006 Chavoustie et al.
2006/0090169 A1 4/2006 Daniels et al.
2006/0106642 A1 5/2006 Reicher et al.
2006/0107196 A1 5/2006 Thanu et al.
2006/0111953 A1 5/2006 Setya
2006/0129415 A1 6/2006 Thukral et al.
2006/0136828 A1 6/2006 Asano
2006/0150090 A1 7/2006 Swamidass
2006/0173908 A1 8/2006 Browning et al.
2006/0190313 A1 8/2006 Lu
2006/0212299 A1 9/2006 Law
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0287998 A1 12/2006 Folting et al.
2006/0294451 A1 12/2006 Kelkar et al.
2007/0027932 A1 2/2007 Thibeault
2007/0033531 A1 2/2007 Marsh
2007/0050322 A1 3/2007 Vigesaa et al.
2007/0050379 A1 3/2007 Day et al.
2007/0073899 A1 3/2007 Judge et al.
2007/0092048 A1 4/2007 Chelstrom et al.
2007/0094607 A1 4/2007 Morgan et al.
2007/0101291 A1 5/2007 Forstall et al.
2007/0106754 A1 5/2007 Moore
2007/0118527 A1 5/2007 Winje et al.
2007/0118813 A1 5/2007 Forstall et al.
2007/0143169 A1 6/2007 Grant et al.
2007/0168861 A1 7/2007 Bell et al.
2007/0174228 A1 7/2007 Folting et al.
2007/0174760 A1 7/2007 Chamberlain et al.
2007/0186173 A1 8/2007 Both et al.
2007/0220119 A1 9/2007 Himmelstein
2007/0233647 A1 10/2007 Rawat et al.
2007/0256043 A1 11/2007 Peters et al.
2007/0282522 A1 12/2007 Geelen
2007/0282627 A1 12/2007 Greenstein et al.
2007/0283259 A1 12/2007 Barry et al.
2007/0294235 A1 12/2007 Millett
2007/0299795 A1 12/2007 Macbeth et al.
2007/0300174 A1 12/2007 Macbeth et al.
2007/0300185 A1 12/2007 Macbeth et al.
2008/0004929 A9 1/2008 Raffel et al.
2008/0005235 A1 1/2008 Hegde et al.
2008/0033777 A1 2/2008 Shukoor
2008/0034307 A1 2/2008 Cisler et al.
2008/0034314 A1 2/2008 Louch et al.
2008/0052291 A1 2/2008 Bender
2008/0059312 A1 3/2008 Gern et al.

(56) References Cited

U.S. PATENT DOCUMENTS

2008/0059539 A1 3/2008 Chin et al.
2008/0065460 A1 3/2008 Raynor
2008/0077530 A1 3/2008 Banas et al.
2008/0097748 A1 4/2008 Haley et al.
2008/0104091 A1 5/2008 Chin
2008/0126389 A1 5/2008 Mush et al.
2008/0133736 A1 6/2008 Wensley et al.
2008/0148140 A1 6/2008 Nakano
2008/0155547 A1 6/2008 Weber et al.
2008/0163075 A1 7/2008 Beck et al.
2008/0183593 A1 7/2008 Dierks
2008/0195948 A1 8/2008 Bauer
2008/0209318 A1 8/2008 Allsop et al.
2008/0216022 A1 9/2008 Lorch et al.
2008/0222192 A1 9/2008 Hughes
2008/0256014 A1 10/2008 Gould et al.
2008/0256429 A1 10/2008 Penner et al.
2008/0270597 A1 10/2008 Tenenti
2008/0282189 A1 11/2008 Hofmann et al.
2008/0295038 A1 11/2008 Helfman et al.
2008/0301237 A1 12/2008 Parsons
2009/0006171 A1 1/2009 Blatchley et al.
2009/0006283 A1 1/2009 Labrie et al.
2009/0013244 A1 1/2009 Cudich et al.
2009/0019383 A1 1/2009 Riley et al.
2009/0024944 A1 1/2009 Louch et al.
2009/0048896 A1 2/2009 Anandan
2009/0049372 A1 2/2009 Goldberg
2009/0077164 A1 3/2009 Phillips et al.
2009/0077217 A1 3/2009 McFarland et al.
2009/0083140 A1 3/2009 Phan
2009/0094514 A1 4/2009 Dargahi et al.
2009/0113310 A1 4/2009 Appleyard et al.
2009/0132470 A1 5/2009 Vignet
2009/0150813 A1 6/2009 Chang et al.
2009/0174680 A1 7/2009 Anzures et al.
2009/0192787 A1 7/2009 Roon
2009/0198715 A1 8/2009 Barbarek
2009/0222760 A1 9/2009 Halverson et al.
2009/0248710 A1 10/2009 McCormack et al.
2009/0271696 A1 10/2009 Bailor et al.
2009/0276692 A1 11/2009 Rosner
2009/0313201 A1 12/2009 Huelsman et al.
2009/0313537 A1 12/2009 Fu et al.
2009/0313570 A1 12/2009 Po et al.
2009/0319623 A1 12/2009 Srinivasan et al.
2009/0319882 A1 12/2009 Morrison et al.
2009/0327240 A1 12/2009 Meehan et al.
2009/0327301 A1 12/2009 Lees et al.
2009/0327851 A1 12/2009 Raposo
2009/0327875 A1 12/2009 Kinkoh
2010/0017699 A1 1/2010 Farrell et al.
2010/0031135 A1 2/2010 Naghshin et al.
2010/0070845 A1 3/2010 Facemire et al.
2010/0070895 A1 3/2010 Messer
2010/0083164 A1 4/2010 Martin et al.
2010/0088636 A1 4/2010 Yerkes et al.
2010/0095219 A1 4/2010 Stachowiak et al.
2010/0095298 A1 4/2010 Seshadrinathan et al.
2010/0100427 A1 4/2010 McKeown et al.
2010/0100463 A1 4/2010 Molotsi et al.
2010/0114926 A1 5/2010 Agrawal et al.
2010/0149005 A1 6/2010 Yoon et al.
2010/0174678 A1 7/2010 Massand
2010/0228752 A1 9/2010 Folting et al.
2010/0241477 A1 9/2010 Nylander et al.
2010/0241948 A1 9/2010 Andeen et al.
2010/0241972 A1 9/2010 Spataro et al.
2010/0241990 A1 9/2010 Gabriel et al.
2010/0251090 A1 9/2010 Chamberlain et al.
2010/0251386 A1 9/2010 Gilzean et al.
2010/0257015 A1 10/2010 Molander
2010/0262625 A1 10/2010 Pittenger
2010/0287163 A1 11/2010 Sridhar et al.
2010/0287221 A1 11/2010 Battepati et al.
2010/0313119 A1 12/2010 Baldwin et al.
2010/0324964 A1 12/2010 Callanan et al.
2010/0332973 A1 12/2010 Kloiber et al.
2011/0010340 A1 1/2011 Hung et al.
2011/0016432 A1 1/2011 Helfman
2011/0028138 A1 2/2011 Davies-Moore et al.
2011/0047484 A1 2/2011 Mount et al.
2011/0055177 A1 3/2011 Chakra et al.
2011/0066933 A1 3/2011 Ludwig
2011/0071869 A1 3/2011 O'Brien et al.
2011/0106636 A1 5/2011 Spear et al.
2011/0119352 A1 5/2011 Perov et al.
2011/0179371 A1 7/2011 Kopycinski et al.
2011/0205231 A1 8/2011 Hartley et al.
2011/0208324 A1 8/2011 Fukatsu
2011/0208732 A1 8/2011 Melton et al.
2011/0209150 A1 8/2011 Hammond et al.
2011/0219321 A1 9/2011 Gonzalez Veron et al.
2011/0225525 A1 9/2011 Chasman et al.
2011/0231273 A1 9/2011 Buchheit
2011/0289397 A1 11/2011 Eastmond et al.
2011/0289439 A1 11/2011 Jugel
2011/0298618 A1 12/2011 Stahl et al.
2011/0302003 A1 12/2011 Shirish et al.
2012/0029962 A1 2/2012 Podgurny et al.
2012/0035974 A1 2/2012 Seybold
2012/0036462 A1 2/2012 Schwartz et al.
2012/0066587 A1 3/2012 Zhou et al.
2012/0072821 A1 3/2012 Bowling
2012/0079408 A1 3/2012 Rohwer
2012/0081762 A1 4/2012 Yamada
2012/0084798 A1 4/2012 Reeves et al.
2012/0086716 A1 4/2012 Reeves et al.
2012/0086717 A1 4/2012 Liu
2012/0089610 A1 4/2012 Agrawal et al.
2012/0089914 A1 4/2012 Holt et al.
2012/0089992 A1 4/2012 Reeves et al.
2012/0096389 A1 4/2012 Flam et al.
2012/0096392 A1 4/2012 Ording et al.
2012/0102432 A1 4/2012 Breedvelt-Schouten et al.
2012/0102543 A1 4/2012 Kohli et al.
2012/0110515 A1 5/2012 Abramoff et al.
2012/0116834 A1 5/2012 Pope et al.
2012/0116835 A1 5/2012 Pope et al.
2012/0131445 A1 5/2012 Oyarzabal et al.
2012/0151173 A1 6/2012 Shirley et al.
2012/0158744 A1 6/2012 Tseng et al.
2012/0192050 A1 7/2012 Campbell et al.
2012/0198322 A1 8/2012 Gulwani et al.
2012/0210252 A1 8/2012 Fedoseyeva et al.
2012/0215574 A1 8/2012 Driessnack et al.
2012/0215578 A1 8/2012 Swierz, III et al.
2012/0233150 A1 9/2012 Naim et al.
2012/0233533 A1 9/2012 Yücel et al.
2012/0246170 A1 9/2012 Lantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Strick et al.
2012/0297307 A1 11/2012 Rider et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2013/0018952 A1 1/2013 McConnell et al.
2013/0018953 A1 1/2013 McConnell et al.
2013/0018960 A1 1/2013 Knysz et al.
2013/0024418 A1 1/2013 Strick et al.
2013/0024760 A1 1/2013 Vogel et al.
2013/0036369 A1 2/2013 Mitchell et al.
2013/0041958 A1 2/2013 Post et al.
2013/0054514 A1 2/2013 Barrett-Kahn et al.
2013/0055113 A1 2/2013 Chazin et al.
2013/0063490 A1 3/2013 Zaman et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.

(56) References Cited

U.S. PATENT DOCUMENTS

2013/0104035 A1 4/2013 Wagner et al.
2013/0111320 A1 5/2013 Campbell et al.
2013/0117268 A1 5/2013 Smith et al.
2013/0159832 A1 6/2013 Ingargiola et al.
2013/0159907 A1 6/2013 Brosche et al.
2013/0179209 A1 7/2013 Milosevich
2013/0211866 A1 8/2013 Gordon et al.
2013/0212197 A1 8/2013 Karlson
2013/0212234 A1 8/2013 Bartlett et al.
2013/0238363 A1 9/2013 Ohta et al.
2013/0238968 A1 9/2013 Barrus
2013/0246384 A1 9/2013 Victor
2013/0262527 A1 10/2013 Hunter
2013/0268331 A1 10/2013 Bitz et al.
2013/0297468 A1 11/2013 Hirsch et al.
2013/0318424 A1 11/2013 Boyd
2013/0339051 A1 12/2013 Dobrean
2014/0006326 A1 1/2014 Bazanov
2014/0019842 A1 1/2014 Montagna et al.
2014/0033307 A1 1/2014 Schmidtler
2014/0043331 A1 2/2014 Makinen et al.
2014/0046638 A1 2/2014 Peloski
2014/0052749 A1 2/2014 Rissanen
2014/0058801 A1 2/2014 Deodhar et al.
2014/0068403 A1 3/2014 Bhargav et al.
2014/0074545 A1 3/2014 Minder et al.
2014/0075301 A1 3/2014 Mihara
2014/0082525 A1 3/2014 Kass et al.
2014/0101527 A1 4/2014 Suciu
2014/0108985 A1 4/2014 Scott et al.
2014/0109012 A1 4/2014 Choudhary et al.
2014/0111516 A1 4/2014 Hall et al.
2014/0115515 A1 4/2014 Adams et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Järvenpää et al.
2014/0172475 A1 6/2014 Olliphant et al.
2014/0173401 A1 6/2014 Oshlag et al.
2014/0181155 A1 6/2014 Homsany
2014/0188748 A1 7/2014 Cavoue et al.
2014/0195933 A1 7/2014 Rao Dv
2014/0214404 A1 7/2014 Kalia et al.
2014/0215303 A1 7/2014 Grigorovitch et al.
2014/0249877 A1 9/2014 Hull et al.
2014/0278638 A1 9/2014 Kreuzkamp et al.
2014/0278720 A1 9/2014 Taguchi
2014/0280287 A1 9/2014 Ganti et al.
2014/0280377 A1 9/2014 Frew
2014/0281868 A1 9/2014 Vogel et al.
2014/0281869 A1 9/2014 Yob
2014/0289223 A1 9/2014 Colwell et al.
2014/0304174 A1 10/2014 Scott et al.
2014/0306837 A1 10/2014 Hauck, III
2014/0310345 A1 10/2014 Megiddo et al.
2014/0324497 A1 10/2014 Verma et al.
2014/0324501 A1 10/2014 Davidow et al.
2014/0365938 A1 12/2014 Black et al.
2014/0372856 A1 12/2014 Radakovitz et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0035918 A1 2/2015 Matsumoto et al.
2015/0067556 A1 3/2015 Tibrewal et al.
2015/0074721 A1 3/2015 Fishman et al.
2015/0074728 A1 3/2015 Chai et al.
2015/0088822 A1 3/2015 Raja et al.
2015/0095752 A1 4/2015 Studer et al.
2015/0106736 A1 4/2015 Torman et al.
2015/0125834 A1 5/2015 Mendoza
2015/0142676 A1 5/2015 McGinnis et al.
2015/0142829 A1 5/2015 Lee et al.
2015/0153943 A1 6/2015 Wang
2015/0154660 A1 6/2015 Weald et al.
2015/0169514 A1 6/2015 Sah et al.
2015/0169531 A1 6/2015 Campbell et al.
2015/0188964 A1 7/2015 Sharma et al.
2015/0212717 A1 7/2015 Nair et al.
2015/0220491 A1 8/2015 Cochrane et al.
2015/0242091 A1 8/2015 Lu et al.
2015/0249864 A1 9/2015 Tang et al.
2015/0261796 A1 9/2015 Gould et al.
2015/0278699 A1 10/2015 Danielsson
2015/0281292 A1 10/2015 Murayama et al.
2015/0295877 A1 10/2015 Roman
2015/0317590 A1 11/2015 Karlson
2015/0324453 A1 11/2015 Werner
2015/0331846 A1 11/2015 Guggilla et al.
2015/0363478 A1 12/2015 Haynes
2015/0370540 A1 12/2015 Coslovi et al.
2015/0370904 A1 12/2015 Joshi et al.
2015/0378542 A1 12/2015 Saito et al.
2015/0378711 A1 12/2015 Cameron et al.
2015/0378979 A1 12/2015 Hirzel et al.
2015/0379472 A1 12/2015 Gilmour et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0055134 A1 2/2016 Sathish et al.
2016/0055374 A1 2/2016 Zhang et al.
2016/0063435 A1 3/2016 Shah et al.
2016/0068960 A1 3/2016 Jung et al.
2016/0078368 A1 3/2016 Kakhandiki et al.
2016/0088480 A1 3/2016 Chen et al.
2016/0092557 A1 3/2016 Stojanovic et al.
2016/0117308 A1 4/2016 Haider et al.
2016/0170586 A1 6/2016 Gallo
2016/0173122 A1 6/2016 Akitomi et al.
2016/0210572 A1 7/2016 Shaaban et al.
2016/0224532 A1 8/2016 Miller et al.
2016/0231915 A1 8/2016 Nhan et al.
2016/0232489 A1 8/2016 Skaaksrud
2016/0246490 A1 8/2016 Cabral
2016/0253982 A1 9/2016 Cheung et al.
2016/0259856 A1 9/2016 Ananthapur et al.
2016/0275150 A1 9/2016 Bournonnais et al.
2016/0299655 A1 10/2016 Migos et al.
2016/0308963 A1 10/2016 Kung
2016/0321235 A1 11/2016 He et al.
2016/0321604 A1 11/2016 Imaeda et al.
2016/0335302 A1 11/2016 Teodorescu et al.
2016/0335303 A1 11/2016 Madhalam et al.
2016/0335731 A1 11/2016 Hall
2016/0335903 A1 11/2016 Mendoza
2016/0344828 A1 11/2016 Häusler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0041296 A1 2/2017 Ford et al.
2017/0052937 A1 2/2017 Sirven et al.
2017/0061342 A1 3/2017 Lore et al.
2017/0061360 A1 3/2017 Rucker et al.
2017/0061820 A1 3/2017 Firoozbakhsh
2017/0063722 A1 3/2017 Cropper et al.
2017/0075557 A1 3/2017 Noble et al.
2017/0076101 A1 3/2017 Kochhar et al.
2017/0090734 A1 3/2017 Fitzpatrick
2017/0090736 A1 3/2017 King et al.
2017/0091337 A1 3/2017 Patterson
2017/0093876 A1 3/2017 Feng et al.
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0124740 A1 5/2017 Campbell et al.
2017/0126772 A1 5/2017 Campbell et al.
2017/0132296 A1 5/2017 Ding
2017/0132652 A1 5/2017 Kedzlie et al.

(56) References Cited

U.S. PATENT DOCUMENTS

2017/0139874 A1 5/2017 Chin
2017/0139884 A1 5/2017 Bendig et al.
2017/0139891 A1 5/2017 Ah-Soon et al.
2017/0140047 A1 5/2017 Bendig et al.
2017/0140219 A1 5/2017 King et al.
2017/0153771 A1 6/2017 Chu
2017/0161246 A1 6/2017 Klima
2017/0177888 A1 6/2017 Arora et al.
2017/0185668 A1 6/2017 Convertino et al.
2017/0200122 A1 7/2017 Edson et al.
2017/0206366 A1 7/2017 Fay et al.
2017/0212924 A1 7/2017 Semlani et al.
2017/0220813 A1 8/2017 Mullins et al.
2017/0221072 A1 8/2017 AthuluruTlrumala et al.
2017/0228445 A1 8/2017 Chiu et al.
2017/0228460 A1 8/2017 Amel et al.
2017/0236081 A1 8/2017 Grady Smith et al.
2017/0242921 A1 8/2017 Rota
2017/0262786 A1 9/2017 Khasis
2017/0270970 A1 9/2017 Ho et al.
2017/0272316 A1 9/2017 Johnson et al.
2017/0272331 A1 9/2017 Lissack
2017/0277669 A1 9/2017 Sekharan
2017/0285879 A1 10/2017 Pilkington et al.
2017/0285890 A1 10/2017 Dolman
2017/0301039 A1 10/2017 Dyer et al.
2017/0315683 A1 11/2017 Boucher et al.
2017/0315974 A1 11/2017 Kong et al.
2017/0315979 A1 11/2017 Boucher et al.
2017/0324692 A1 11/2017 Zhou
2017/0351252 A1 12/2017 Kleifges et al.
2017/0372442 A1 12/2017 Mejias
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0055434 A1 3/2018 Cheung et al.
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0081863 A1 3/2018 Bathla
2018/0081868 A1 3/2018 Willcock et al.
2018/0088753 A1 3/2018 Viégas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121994 A1 5/2018 Matsunaga et al.
2018/0128636 A1 5/2018 Zhou
2018/0129651 A1 5/2018 Latvala et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0181650 A1 6/2018 Komatsuda et al.
2018/0181716 A1 6/2018 Mander et al.
2018/0210936 A1 7/2018 Reynolds et al.
2018/0225270 A1 8/2018 Bhide et al.
2018/0260371 A1 9/2018 Theodore et al.
2018/0276417 A1 9/2018 Cerezo
2018/0293217 A1 10/2018 Callaghan
2018/0293669 A1 10/2018 Jackson et al.
2018/0329930 A1 11/2018 Eberlein et al.
2018/0330320 A1 11/2018 Kohli
2018/0357305 A1 12/2018 Kinast et al.
2018/0365429 A1 12/2018 Segal
2018/0367484 A1 12/2018 Rodriguez et al.
2018/0373434 A1 12/2018 Switzer et al.
2018/0373757 A1 12/2018 Schukovets et al.
2019/0005094 A1 1/2019 Yi et al.
2019/0012342 A1 1/2019 Cohn
2019/0036989 A1 1/2019 Eirinberg et al.
2019/0042628 A1 2/2019 Rajpara
2019/0050445 A1 2/2019 Griffith et al.
2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0095413 A1 3/2019 Davis et al.
2019/0108046 A1 4/2019 Spencer-Harper et al.
2019/0113935 A1 4/2019 Kuo et al.
2019/0114308 A1 4/2019 Hancock
2019/0123924 A1 4/2019 Embiricos et al.
2019/0130611 A1 5/2019 Black et al.
2019/0138588 A1 5/2019 Silk et al.
2019/0138653 A1 5/2019 Roller et al.
2019/0155821 A1 5/2019 Dirisala
2019/0179501 A1 6/2019 Seeley et al.
2019/0208058 A1 7/2019 Dvorkin et al.
2019/0220161 A1* 7/2019 Loftus ................. G06F 3/04883
2019/0236188 A1 8/2019 McKenna
2019/0243879 A1 8/2019 Harley et al.
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0324840 A1 10/2019 Malamut et al.
2019/0325012 A1 10/2019 Delaney et al.
2019/0347077 A1 11/2019 Huebra
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2019/0391707 A1 12/2019 Ristow et al.
2020/0005248 A1 1/2020 Gerzi et al.
2020/0005295 A1 1/2020 Murphy
2020/0012629 A1 1/2020 Lereya et al.
2020/0019548 A1 1/2020 Agnew et al.
2020/0019595 A1 1/2020 Azua
2020/0026397 A1 1/2020 Wohlstadter et al.
2020/0042648 A1 2/2020 Rao
2020/0050696 A1 2/2020 Mowatt et al.
2020/0053176 A1 2/2020 Jimenez et al.
2020/0125574 A1 4/2020 Ghoshal et al.
2020/0134002 A1 4/2020 Tung et al.
2020/0142546 A1 5/2020 Breedvelt-Schouten et al.
2020/0151630 A1 5/2020 Shakhnovich
2020/0159558 A1 5/2020 Bak et al.
2020/0175094 A1 6/2020 Palmer
2020/0192785 A1 6/2020 Chen
2020/0247661 A1 8/2020 Rao et al.
2020/0265112 A1 8/2020 Fox et al.
2020/0279315 A1 9/2020 Manggala
2020/0293616 A1 9/2020 Nelson et al.
2020/0301678 A1 9/2020 Burman et al.
2020/0301902 A1 9/2020 Maloy et al.
2020/0310835 A1* 10/2020 Momchilov ........ G06F 3/04817
2020/0327244 A1 10/2020 Blass et al.
2020/0334019 A1 10/2020 Bosworth et al.
2020/0348809 A1 11/2020 Drescher
2020/0349320 A1 11/2020 Owens
2020/0356740 A1 11/2020 Principato
2020/0356873 A1 11/2020 Nawrocke et al.
2020/0380212 A1 12/2020 Butler et al.
2020/0380449 A1 12/2020 Choi
2020/0387664 A1 12/2020 Kusumura et al.
2020/0401581 A1 12/2020 Eubank et al.
2021/0014136 A1 1/2021 Rath
2021/0019287 A1 1/2021 Prasad et al.
2021/0021603 A1 1/2021 Gibbons
2021/0034058 A1 2/2021 Subramanian et al.
2021/0042796 A1 2/2021 Khoury et al.
2021/0049555 A1 2/2021 Shor
2021/0055955 A1 2/2021 Yankelevich et al.
2021/0056509 A1 2/2021 Lindy
2021/0072883 A1 3/2021 Migunova et al.
2021/0073526 A1 3/2021 Zeng et al.
2021/0084120 A1 3/2021 Fisher et al.

(56) References Cited

U.S. PATENT DOCUMENTS

| | | | |
|---|---|---|---|
| 2021/0124749 | A1 | 4/2021 | Suzuki et al. |
| 2021/0124872 | A1 | 4/2021 | Lereya |
| 2021/0136027 | A1 | 5/2021 | Barbitta et al. |
| 2021/0149553 | A1 | 5/2021 | Lereya et al. |
| 2021/0150489 | A1 | 5/2021 | Haramati et al. |
| 2021/0165782 | A1 | 6/2021 | Deshpande et al. |
| 2021/0166196 | A1 | 6/2021 | Lereya et al. |
| 2021/0166339 | A1 | 6/2021 | Mann et al. |
| 2021/0173682 | A1 | 6/2021 | Chakraborti et al. |
| 2021/0174006 | A1 | 6/2021 | Stokes |
| 2021/0192126 | A1 | 6/2021 | Gehrmann et al. |
| 2021/0264220 | A1 | 8/2021 | Wei et al. |
| 2021/0326519 | A1 | 10/2021 | Lin et al. |
| 2022/0221591 | A1 | 7/2022 | Smith et al. |

FOREIGN PATENT DOCUMENTS

| | | | |
|---|---|---|---|
| CN | 107123424 | A | 9/2017 |
| CN | 107422666 | A | 12/2017 |
| CN | 107623596 | A | 1/2018 |
| CN | 107885656 | A | 4/2018 |
| CN | 112929172 | A | 6/2021 |
| EP | 3443466 | B1 | 12/2021 |
| KR | 20150100760 | | 9/2015 |
| WO | WO 2004100015 | A2 | 11/2004 |
| WO | WO 2006116580 | A2 | 11/2006 |
| WO | WO 2008109541 | A1 | 9/2008 |
| WO | WO 2017202159 | A1 | 11/2017 |
| WO | WO 2020187408 | A1 | 9/2020 |
| WO | WO 2021096944 | A1 | 5/2021 |
| WO | WO 2021144656 | A1 | 7/2021 |
| WO | WO 2021161104 | A1 | 8/2021 |
| WO | WO 2021220058 | A1 | 11/2021 |

OTHER PUBLICATIONS

Rordigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/1B2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2020/000024, dated May 3, 2021 (13 pages).
"Pivottable—Wikipedia"; URL: https://en.wikepedia .org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/1B2021/000297, dated Oct. 12, 2021 (20 pages).
Dapulse.com "features".extracted from web.archive.or/web/2014091818421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.
Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).
Kollmann, Franz, "Realizing Fine-Granular Read and Write Rights on Tree Structured Documents." in the Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked Column and Bar Charts", Aug. 2011, Peltier Technical Services, Inc., pp. 1-128; (Year: 2011).
Beate List, "An Evaluation of Conceptual Business Process Modelling Languages", 2006, SAC'06, Apr. 23-27, pp. 1532-1539 (Year: 2006).
"Demonstracion en espanol de Monday.com", published Feb. 20, 2019. https://www.youtube.com/watch?v=z0qydTgof1A (Year: 2019).
Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Gutwin, C. et al., "Supporting Informal Collaboration in Shared-Workspace Groupware", J. Univers. Comput. Sci., 14(9), 1411-1434 (2008).
Barai, S., et al., "Image Annotation System Using Visual and Textual Features", In: Proceedings of the 16th International Conference on Distributed Multi-media Systems, pp. 289-296 (2010).
B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).
Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).

* cited by examiner

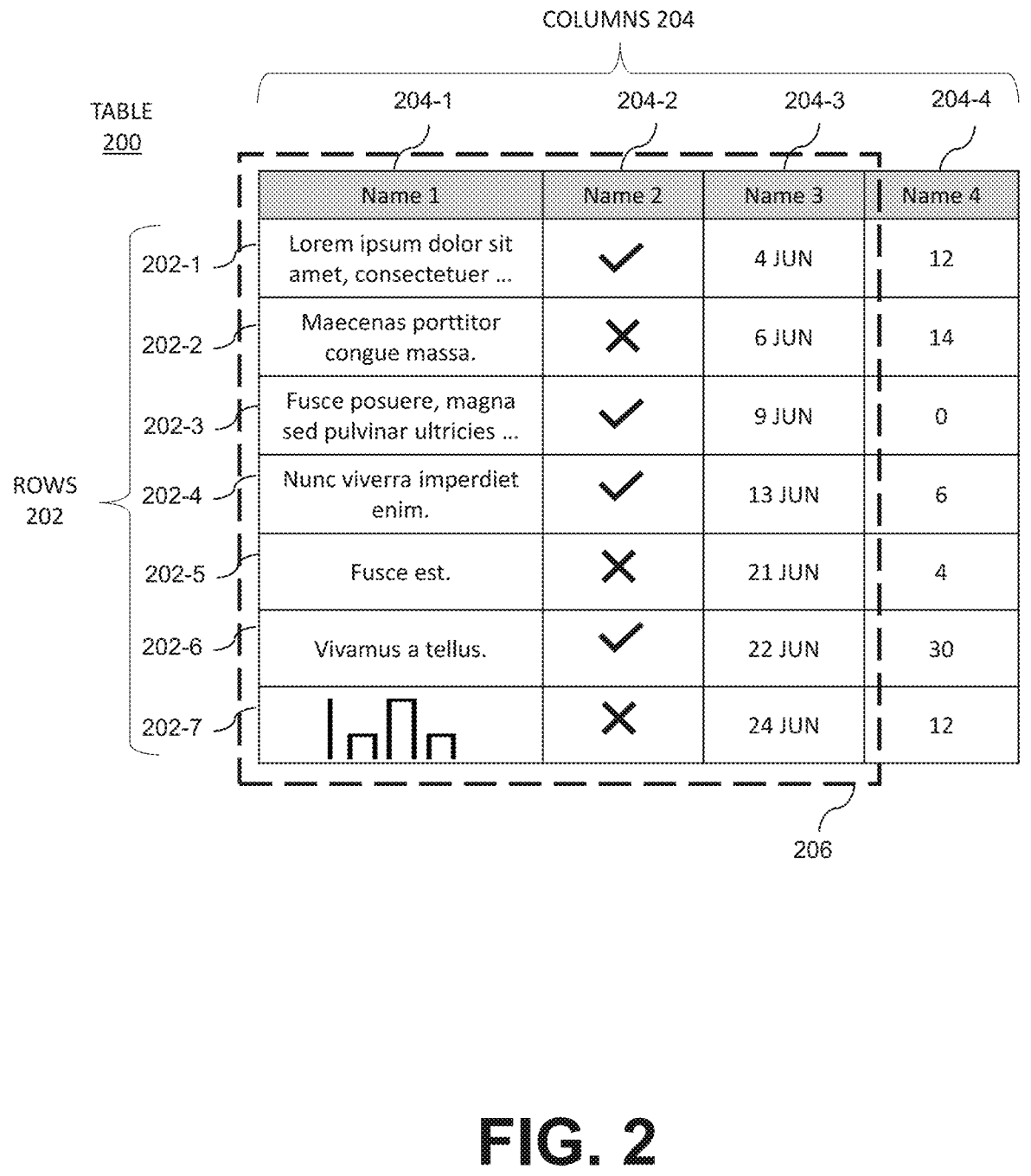

| Name 1 | Name 2 | Name 3 | Name 4 |
|---|---|---|---|
| Lorem ipsum dolor sit amet, consectetuer ... | ✓ | 4 JUN | 12 |
| Maecenas porttitor congue massa. | ✕ | 6 JUN | 14 |
| Fusce posuere, magna sed pulvinar ultricies ... | ✓ | 9 JUN | 0 |
| Nunc viverra imperdiet enim. | ✓ | 13 JUN | 6 |
| Fusce est. | ✕ | 21 JUN | 4 |
| Vivamus a tellus. | ✓ | 22 JUN | 30 |
|  | ✕ | 24 JUN | 12 |

FIG. 2

COLUMNS 204

206

TABLE 100

| Name 1 | Name 2 | Name 3 | Name 4 |
|---|---|---|---|
| Lorem ipsum dolor sit amet, consectetuer adipiscing elit. | ✓ | 4 JUN | 12 |
| Maecenas porttitor congue massa. | ✕ | 6 JUN | 14 |
| Fusce posuere, magna sed pulvinar ultricies, purus lectus malesuada libero, sit amet commodo magna eros quis urna. | ✓ | 9 JUN | 0 |
| Nunc viverra imperdiet enim. | ✓ | 13 JUN | 6 |
| Fusce est. | ✕ | 21 JUN | 4 |
| Vivamus a tellus. | ✓ | 22 JUN | 30 |
|  | ✕ | 24 JUN | 12 |

204-1 204-2 204-3 204-4

ROWS 202

COLUMNS 204

TABLE 200

ROWS 202

| | 204-1 | 204-2 | 204-3 | 204-4 |
|---|---|---|---|---|
| | Name 1 | Name 2 | Name 3 | Name 4 |
| 202-1 | Lorem ipsum dolor sit amet, consectetuer adipiscing elit. | ✓ | 4 JUN | 12 |
| 202-2 | Maecenas porttitor congue massa. | ✗ | 6 JUN | 14 |
| 202-3 | Fusce posuere, magna sed pulvinar ultricies, purus lectus malesuada libero, sit amet commodo magna eros quis urna. | ✓ | 9 JUN | 0 |
| 202-4 | Nunc viverra imperdiet enim. | ✓ | 13 JUN | 6 |
| 202-5 | Fusce est. | ✗ | 21 JUN | 4 |
| 202-6 | Vivamus a tellus. | ✓ | 22 JUN | 30 |
| 202-7 | | ✗ | 24 JUN | 12 |

DIGITAL PROCESSING SYSTEMS AND METHODS FOR NAVIGATING AND VIEWING DISPLAYED CONTENT

TECHNICAL FIELD

The present disclosure relates generally to information display method and content navigation. More specifically, this disclosure relates to systems and methods for navigating and viewing displayed content, such as by performing table navigation and manipulation operations on a computer display. Consistent with the disclosed embodiments, non-transitory computer-readable storage media may store program instructions, which may be executable by at least one processing device and perform any of the steps and/or methods described herein.

BACKGROUND

Operation of modern enterprises can be complicated and time-consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project.

In addition, project management software applications often rely on the use of data tables to illustrate the plurality of tasks required by a project, the distribution of tasks, or the progress of tasks. Most of the time, by convention, the width and height of all cells in a table displayed on any display device are the same. If a cell contains a particularly large piece of information, the entire piece of information may not be displayed, which impacts the readability and practicality of the table. This is notably true for mobile devices having particularly limited display dimensions.

Changing the dimensions of such a cell usually requires specific operations that take time, which has an impact on the efficiency of the table user. Therefore, it is essential to be able to quickly display all the information included in the cells on a table, while a user navigates through displayed content. The present disclosure describes solutions to address or overcome one or more of the above-stated problems, among other drawbacks in traditional systems.

SUMMARY

Embodiments consistent with the present disclosure provide systems and methods for performing table navigation operations on a display. The disclosed embodiments may be implemented using a combination of conventional hardware and software as well as specialized hardware and software.

In an embodiment, a non-transitory computer-readable medium containing instructions that, when executed, cause at least one processor to perform table navigation operations on a display, wherein the table comprises rows and columns and at least one cell that contains more information than presented on the display is disclosed. The operations may comprise receiving a scroll signal for scrolling the table, wherein the scroll signal results from a motion of a user on the display; in response to a vertical component in the motion, causing the table to scroll vertically; in response to a horizontal component in the motion, causing the table to scroll horizontally; receiving an enhancing scroll signal resulting from an enhancing motion for revealing hidden information within the at least one cell on the table; and in response to the enhancing scroll signal, revealing at least a portion of the hidden information within the at least one cell.

In another embodiment, a method for performing table navigation operations on a display, wherein the table comprises rows and columns and at least one cell that contains more information than it presents is disclosed. The method may comprise: receiving a scroll signal for scrolling the table, wherein the scroll signal results from a motion of a user on the display; in response to a vertical component in the motion, causing the table to scroll vertically; in response to a horizontal component in the motion, causing the table to scroll horizontally; receiving an enhancing scroll signal resulting from an enhancing motion for revealing hidden information within the at least one cell on the table; and in response to the enhancing scroll signal, revealing at least a portion of the hidden information within the at least one cell.

In yet another embodiment, a system for performing table navigation operations on a display, wherein the table comprises rows and columns and at least one cell that contains more information than it presents is disclosed. The system may comprise a memory storing instructions and at least one processor that executes the stored instructions to receive a scroll signal for scrolling the table, wherein the scroll signal results from a motion of a user on the display; in response to a vertical component in the motion, cause the table to scroll vertically; in response to a horizontal component in the motion, cause the table to scroll horizontally; receive an enhancing scroll signal resulting from an enhancing motion for revealing hidden information within the at least one cell on the table; and in response to the enhancing scroll signal, reveal at least a portion of the hidden information within the at least one cell.

Other advantages of the invention are set forth in the appended claims which form an integral part hereof. The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is an illustration of an exemplary table presented on a display comprising rows and columns and at least one cell that contains more information than presented on the display, consistent with disclosed embodiments.

FIGS. 3A-3B are illustrations of exemplary tables presented on a display comprising rows and columns after reception of an enhancing scroll signal, the at least one cell that initially contained more information than presented on the display is in an enhanced form, consistent with disclosed embodiments.

DETAILED DESCRIPTION

Figure 1:
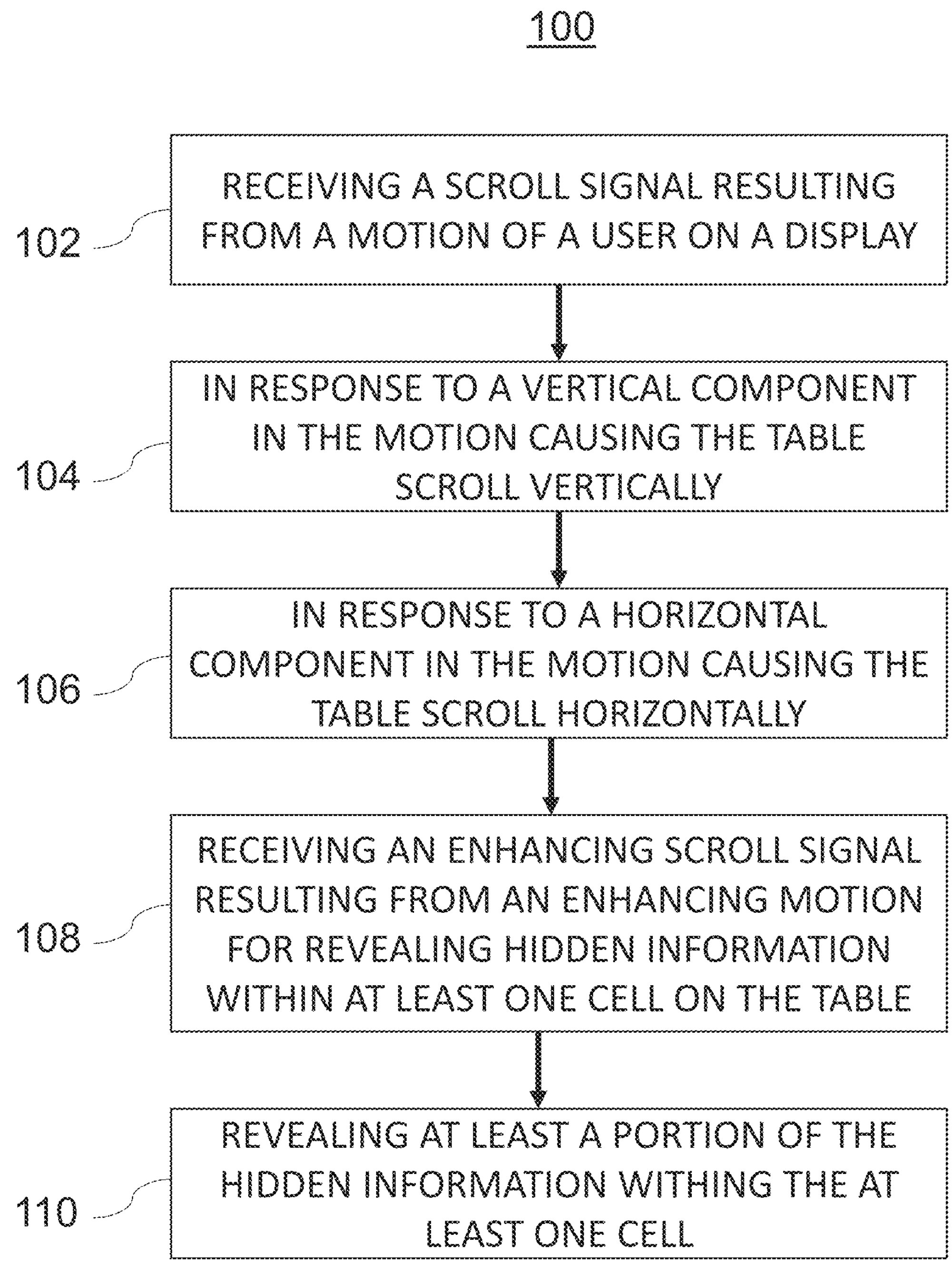
FIG. 1 is a flowchart of an exemplary process for performing table navigation operations, consistent with disclosed embodiments.

Disclosed embodiments provide new and improved techniques for navigating and viewing displayed content, including techniques for dynamically modifying display of table content to display all contents of a table cell, in response to detection of an enhanced scroll signal.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Disclosed embodiments may include at least one processor may be configured to execute stored instructions to perform table navigation operations on a display. In some embodiments, the table may comprise rows and columns and at least one cell that may contain more information than presented on the display. In some embodiments, the table may include a data structure such as a relational database having entries organized in rows and columns, with data occupying or potentially occupying each cell formed by a row-column intersection.

As used in this disclosure, the term "display" refers either to any physical device capable of providing a visual representation of a table or directly to a visual representation of a table. Examples of physical devices acting as displays may include computer screens, smartphone screens, tablet screens, smartwatch screens, laptop screens, video walls, projectors, head-mounted displays or virtual reality headsets. Additionally, displays may utilize graphical user interfaces (GUIs) to permit user interaction with data. In many GUIs, a visual representation of table is often provided using a graphical user interface component known as a window. Any visual representation of a device or display may be characterized by dimensions, these dimensions are limited to the physical dimensions of the device, and often, a table may not be completely presented on a display device or fit a window. This drawback is common among devices with small screens, such as smartphones or tablets. The dimensions of the table cells may therefore be limited by the dimensions of the display.

Above and throughout this disclosure, the term "information" or "piece of information" may refer to any type of data with a visual representation, such as text, images, numbers, diagrams, drawings or GUI components that may be included in a table cell. Each piece of information may have an associated size, such as a size that a piece of information may have when fully presented on a display. The associated size of an information may be larger than the dimensions of a table cell, in such a situation the entirety of the information may therefore be not displayed in the table cell, or fit the table cell. Accordingly, the information may be split into two parts, a first part that is visible, and presented on a display and a second part that is hidden and not presented on the display.

FIG. 1 is a flowchart of an exemplary process (100) for performing table navigation operations on a display that may be executed by at least one processor. Process 100 is discussed herein for explanatory purposes and is not intended to be limiting. In some embodiments, steps of process 100 may be changed, modified, substituted, or rearranged, consistent with the present disclosure. Process 100 may be implemented using one or more components of a computing device 400 (discussed in FIG. 4) or user device 520 of computing architecture 500 (discussed in FIG. 5). Disclosed embodiments may include at least one processor that may be configured to execute stored instructions to perform table navigation operations on a display. In some embodiments, the table may comprise rows and columns and at least one cell that may contain more information than presented on the display. As shown in FIG. 1, process 100 may include steps 102, 104, 106, 108, and 110, as shown, discussed in further detail below.

FIG. 2 is an exemplary illustration of a table presented on a display comprising rows and columns and at least one cell that contains more information than presented on the display, in accordance with the disclosed embodiments. FIG. 2 illustrates table 200 comprising a plurality of rows 202 and columns 204 presented on a display 206, the dimensions of which are illustrated by a dotted line. Table 200 cells comprise different types of information, such as text, pictures, numbers, or dates. Table 200 comprises three cells that contain more information than presented on the display 206. These three cells are all included in the first column 204-1 and are located in rows 202-1, 202.3, and 202-7 respectively. The first two cells (202-1/204-1, 202-3/204-1) comprise a text that is not entirely displayed as indicated by the presence of suspension points. Cell (202-7/204-1) includes a histogram, which is larger in size than cell (202-7/204-1), thus it is displayed in a cropped version where only the top of the histogram is visible. Note in the situation illustrated in FIG. 2 table 200 is not entirely presented on display 206, the whole of table 200 is shown to get a sense of the actual dimensions of table 200, portions of table 200 that are not comprised within the dashed line are not presented on display 206.

In some embodiments, all table cells may share at least one common dimension. A common dimension may refer to a common width, a common height or both a common height and width. For example, as illustrated in FIG. 2, table cells from the first column 204-1 are sharing a common height with table cells from the other columns (204-2, 204-3, 204-4) but they have a different width. In some other embodiments, all table cells may have different dimensions. The fact that all the cells in the table do or do not share at least one common dimension may be the result of a specific set of instructions. This instruction set may have different origins, for example, it can be directly related to the display, the displayed table or a user input.

In some embodiments, the table may not be entirely displayed. For example, some rows or columns may not be visible as the table does not fit the dimensions of the display. This situation is illustrated in FIG. 2 where only the first three columns (204-1 through 204-3) fit within the dimensions of display 206. To permit a user to access different portions of a table that are not displayed a scroll signal for scrolling the table may be used.

Referring again to FIG. 1, in step 102, at least one processor may receive a scroll signal for scrolling the table, wherein the scroll signal results from a motion of a user on the display. A scroll signal may be a command or input that causes a displayed page or document to move on the display, or in a window on the display, to a particular portion of the page/document. Consistent with disclosed embodiments, the scroll signal may be the result of, for example, a motion performed by a user on a touch-sensitive layer of the display, user control of a computer mouse or stylus, or computer input with one or more keys on a keyboard. This motion may correspond to manipulating one or more device controls or GUI components such as scroll bars, a particular movement made by the user or any type of user input related to the display, for scrolling the table. For example, a scroll signal can be the result of moving a cursor docked on or near a scroll bar, clicking on increment/decrement control buttons, using the scroll wheel button of a mouse, or a user performing one or more recognized gestures such as a swipe motion relative to the display.

Referring again to FIG. 1, in step 104, in response to a vertical component in the motion, the at least one processor may cause the table to scroll vertically. As discussed herein, the display may have a vertical dimension extending along a first axis, such as a vertical axis, and a horizontal dimension extending along a second axis perpendicular to the first axis, such as a horizontal axis. Consistent with this disclosure, the motion may comprise at least one of a vertical or horizontal component. A vertical or horizontal component of motion may refer to a part of the direction of motion aligned with the vertical or horizontal axis or to an interaction with a GUI component that causes a scrolling along the vertical or horizontal axis. The at least one processor may be configured to detect a motion of the user using one or more input devices, such as a touch-sensitive layer of the display screen, and analyze the motion to detect one or more of a horizontal or vertical component of the motion. The at least one processor may move the page vertically, such as upward or downward, on the display, in response to the vertical component of the motion.

In step 106, in response to a horizontal component in the motion, the at least one processor may cause the table to scroll horizontally. Similar to the vertical scroll discussed above, the at least one processor may be configured to detect a motion of the user using one or more input devices, such as a touch-sensitive layer of the display screen, and analyze the motion to detect a horizontal component of the motion. The at least one processor may move the page horizontally, such as left or right, on the display, in response to the horizontal component of the motion.

For example, in the situation illustrated in FIG. 2, a motion with a horizontal (leftward) component may cause table 200 to scroll horizontally, which may cause a larger portion of the fourth column 204-4 to appear on the display 206. In some embodiments, scrolling the table may be proportional to a length of the motion. In the context of this description, a "length" of the motion may refer to a physical length, a time duration of motion or a combination thereof.

In step 108, the at least one processor may receive an enhancing scroll signal resulting from an enhancing motion for revealing hidden information within the at least one cell on the table. In accordance with the disclosed embodiments, upon reception of an enhancing scroll signal, portions of the hidden information within the at least one cell may be revealed, wherein the enhancing scroll signal may be the result of an enhancing motion for revealing hidden information within the at least one cell. An enhancing motion may correspond to manipulating various controls on GUI components, a particular movement made by the user or any type of user input related to the display, for revealing hidden information within the at least one cell. Examples of an enhancing motion may include performing a swipe motion relative to the display that is interpreted differently than the scroll signal, persistently clicking at a particular location of the display, double or repeatedly tapping a particular location on the display, performing a pinching out motion relative to the display, and other motions or commands that are interpreted differently than a scroll signal due to the satisfaction of one or more conditions. In some embodiments, the enhancing motion may be different from a motion capable of scrolling the table horizontally or vertically.

In step 110, in response to the enhancing scroll signal, the at least one processor may reveal at least a portion of the hidden information within the at least one cell. In some embodiments, responsive to receipt of an enhancing motion, the at least one cell may be displayed in an enhanced form, such that a portion of the hidden information may be revealed.

In some embodiments, revealing the hidden information may be progressive, and a ratio between an amount of the information revealed and an amount of information initially hidden may be proportional to a length of the enhancing motion. In the context of this description, a progressive revelation may refer to a situation in which the transition from a state in which some of the information in a table cell is hidden to a state in which all of the information is visible in the table cell is not sudden. Instead, the revelation may proceed continuously or step by step. For example, if a fairly long text is included in a cell and only part of it is visible, instead of revealing all the missing words at once, the process may be progressive, revealing the hidden part of the text word by word or sentence by sentence. To carry out this progressive revelation, a ratio between a quantity of revealed information and a quantity of information initially hidden, such as prior to any enhancing scroll motion can be used. As an example, one may consider a situation where the information contained in a cell is an image and only one-third of the image is visible. Two-thirds of the image may hidden, and after the revelation process starts, half of the image may become visible, such that the ratio between the amount of information revealed and the amount of information initially hidden is 25%. The revelation process continues, two-thirds of the image is now visible, and the ratio is 50%. The process continues and ends when the ratio is 100%.

In some embodiments, the ratio may be proportional to a length of the enhancing motion. A length of the motion may include a physical length of the motion on the display, a time duration of motion, or a combination thereof. For example, if the enhancing motion corresponds to a swipe motion made by a user across a display, the longer the distance of the swipe motion across the display, the larger the ratio between the quantity of information revealed to the quantity of information initially hidden. In another example, if the enhancing movement corresponds to a persistent touch of a part of a display, the longer the duration of the persistent touch, the larger the ratio between the quantity of revealed information and the quantity of information initially hidden.

In some embodiments, "revealing" hidden information may include making visible at least a part of the information that was not previously visible, accessible, or presented on a display. For example, referring to FIG. 2, revealing the histogram included in cell (202-7/204-1) may correspond to displaying the whole histogram.

In some embodiments, the enhancing motion may correspond to a motion capable of scrolling the table horizontally or vertically. In such embodiments, a result of the motion may correspond to at least one of: revealing hidden information within the at least one cell on the table if the motion is performed on a predetermined portion of the display; or, causing the table to scroll horizontally or vertically if the motion is performed on a portion different from the predetermined portion of the display. In some embodiments, a predetermined portion of the display may refer to a portion of the display having certain characteristics. Examples of a predetermined portion of a display may include, a corner, an edge, or a zone of a display. Consistent with this disclosure, performing a motion capable of scrolling the table horizontally or vertically on a predetermined zone may result in revealing hidden information within at least one cell.

Referring to FIG. 2, a predetermined portion of display 206 may correspond to the leftmost area of display 206 with a height corresponding to the height of the display and a width corresponding to 10% of the width of the display. If the motion capable of scrolling the table horizontally is a horizontal swipe motion, a horizontal swipe motion starting within the predetermined portion may result in the revelation of hidden information, and a swipe motion starting outside the predetermined portion (for example in the central zone) may result in the horizontal scrolling of the table.

In some embodiments, revealing the hidden information may cease after the enhancing motion terminates. Ceasing to reveal hidden information may refer to the end of the revelation process, regardless of whether all the hidden information in the at least one cell has been revealed. For example, in a situation wherein a ratio between an amount of the information revealed and an amount of information initially hidden is proportional to a length of the enhancing motion, the enhancing motion may terminate before the length of the enhancing motion reach a value corresponding to a ratio equal to 100%. In some embodiments, ceasing to reveal hidden information in the at least one cell may comprise restoring an initial situation in which none of the hidden information in the at least one cell is revealed. For example, if 60% of the initially hidden information of at least one cell was revealed before the enhancing motion terminates after the enhancing motion terminates the initial situation in which 0% of the initially hidden information is revealed will be presented on the display. In some embodiments, restoring the initial situation in which none of the hidden information in the at least one cell is revealed may be progressive or sudden.

In some embodiments, the hidden information may be revealed for a predetermined time period. Revealing for a predetermined time period may involve the at least one cell remaining in an enhanced form for a predetermined amount of time after the enhancing motion terminates, or after another trigger consistent with disclosed embodiments. Examples of a predetermined time period may include 1, 2, 5, 10 seconds or any suitable time period. In some embodiments, once the predetermined time is over, the displayed table may revert to its initial appearance, in which the revealed information in the at least one cell becomes hidden again. For example, if at least one cell is in an enhanced form after receiving an enhancement scroll signal, the at least one cell may remain in the enhanced form for a predetermined period of time (for example, 2 seconds) before returning to an initial state. In some further embodiments, restoring the initial situation in which none of the hidden information in the at least one cell is revealed may be progressive or sudden.

In some embodiments, the enhancing scroll signal may be based on a scroll motion performed beyond an end of the table. An end of the table may me associated with any characteristics of the outermost edges, locations, or sides of the table. An ends of a table may include, for example, a first or last row, a first or last column, outer borders, outer corners, or row or column labels. For example, with reference to FIG. 2, one end of the table 200 may correspond to the first column 204-1, the enhancement movement may be based on a scrolling movement beyond the first column 204-1, when no scrolling to the left of the table is possible since the left edge of the first column is displayed.

In some embodiments, the at least one cell may be located at a first end of the table or at a second end of the table opposite the first end. A first end of the table may correspond to a first row or column, and a second end of the table opposite to the first end may correspond to a last row or column. For example, as illustrated in FIG. 2, the three cells ((202-1/204-1), (202-3/204-1), (202-7/204-1)), that contain more information than presented on the display are all included in the first column 204-1.

In some further embodiments, wherein the enhancing scroll signal is based on a scroll motion performed beyond an end of the table, the hidden information may be revealed while the enhanced scroll motion is performed on a predetermined portion of the display. As mentioned above, a predetermined portion of the display may refer to a portion of the display having certain characteristics. With reference to FIG. 2, a predetermined portion of display 206 may correspond to the leftmost area of display 206 with a height corresponding to the height of the display and a width corresponding to 20% of the width of the display. If the enhancement scroll signal is based on a scrolling motion capable of scrolling the display horizontally, performed beyond one end of the table (e.g., the left edge of table 200)

as a horizontal swipe motion, a leftward horizontal swipe motion starting inside the predetermined portion performed beyond the left edge of table 200 may result in the revelation of hidden information, and a leftward horizontal swipe motion starting outside the predetermined portion performed beyond the left edge table 200 may result in the table scrolling horizontally to the left edge of table 200.

In some embodiments where the enhancing scroll signal is based on a scroll motion performed beyond an end of the table, the at least one processor may cause both scrolling and a partial revealing of the hidden information if the scroll signal exceeds a threshold. In the context of this description, a threshold may refer to a certain length of a scroll signal where the scroll signal may be initially executed to scroll the table and is long enough to scroll the table beyond one end of the table. Examples of a threshold may include a physical length threshold, a time duration of motion threshold or a combination thereof. In accordance with this disclosure, such a scroll signal, rather than scrolling only to one end of the table, may also cause a partial revelation of information hidden in at least one cell. A partial revealing of the hidden information may refer to a certain percentage of the information being revealed. In some embodiments, a partial revealing of the hidden information may include revealing a percentage of the hidden information strictly below 100%. A user without prior knowledge of the existence of an enhancing scrolling motion may discover this feature by performing a scrolling signal exceeding the threshold.

In some embodiments, revealing the hidden information may include at least one of: enlarging the at least one cell in order to present all the information contained within the at least one cell; or modifying a size of all information contained within the at least one cell to enable presentation of all the information contained within the at least one cell without changing dimensions of the at least one cell. Enlarging the at least one cell may refer to increasing at least one of the dimensions of the at least one cell. Modifying a size of all information contained within the at least one cell without changing dimensions of the at least one cell, on the other hand may refer to reducing the associated size of all information contained within the at least one cell, to fit within the dimensions of the at least one cell. Accordingly, a cell in an enhanced form may either have at least one of its dimensions increased or comprise a piece of information with reduced dimensions. In other embodiments, revealing the hidden information may include a combination of enlarging the at least one cell and modifying a size of all information contained within the at least one cell in order to present all the information contained within the at least one cell. In such a situation, a compromise may be found between dimensions that are too large for a cell and dimensions that are too small for a piece of information. In some other embodiments, revealing the hidden information may include enlarging the dimensions of the at least one cell to the dimensions of the display, and if in the enlarged version of the at least one cell not all of the hidden information is revealed, further modifying a size of the information to enable a presentation of all of the information contained in the enlarged version of the at least one cell.

FIGS. 3A and 3B illustrate two tables presented on a display comprising rows and columns after reception of an enhancing scroll signal, the at least one cell that initially contained more information than presented on the display is in an enhanced form, in accordance with the disclosed embodiments. Tables illustrated in these figures correspond to table 200 illustrated before in FIG. 2 wherein the three cells ((202-1/204-1), (202-3/204-1), (202-7/204-1)) that initially contained more information than presented on display 206 are now in an enhanced form wherein all of the information comprised in these cells is now visible. The text included in the first two cells (202-1/204-1, 202-3/204-1) is now entirely displayed and the histogram included in the third cell (202-7/204-1) is now fully displayed. Note in the situation illustrated in FIGS. 3A and 3B table 200 is not entirely presented on display 206, the whole of table 200 is shown to get a sense of the actual dimensions of table 200 wherein the three cells are in the enhanced form, portions of table 200 that are not comprised within the dashed line are not presented on display 206.

In some embodiments, the enlarged at least one cell may include at least one of an increased height, an expansion in width, or an expansion in both height and width. For example, as illustrated in FIG. 3A, the height of the three cells ((202-1/204-1), (202-3/204-1), (202-7/204-1)) has been increased, so that all the information comprised in these cells is now visible. Note that in the situation illustrated in FIG. 3A, since the height of cells ((202-1/204-1), (202-3/204-1), (202-7/204-1)) has been increased, table 200 no longer fits the vertical dimension of display 206, and only the first five rows (202-1 through 202-5) and first three columns (204-1 through 204-2) are presented on display 206. Further, in some embodiments, enlarging the at least one cell may include increasing a first dimension of the at least one cell until it reaches a corresponding display dimension, and if the enlarged version of the at least one cell is not sufficient to reveal all of the hidden information, increasing a second dimension of the at least one cell. For example, referring to FIG. 3A, the enlargement of the three cells ((202-1/204-1), (202-3/204-1), (202-7/204-1)) could have started by enlarging the width of these cells until the horizontal dimension of display 206 is reached and if in this situation not all hidden information was revealed, the enlargement of the cells ((202-1/204-1), (202-3/204-1), (202-7/204-1)) could have continued by enlarging the height of these cells. In yet other embodiments, enlarging the at least one cell may include increasing a first dimension of the at least one cell until it reaches a first corresponding display dimension and increasing a second dimension of the at least one cell beyond a second corresponding display dimension. In a situation where the information included in the at least one cell has dimensions greater than the dimensions of the display, enlarging the at least one cell may require increasing at least one of the dimensions of the at least one cell beyond one of the dimensions of the display.

In some embodiments, at least one dimension of one or more cells adjacent to the at least one cell may remain unchanged. A cell adjacent to the at least one cell may refer to a cell that shares at least one edge with the at least one cell. For example, as illustrated in FIG. 3B, in which the associated size of the information comprised in cells ((202-1/204-1), (202-3/204-1), (202-7/204-1)) has been decreased to fit the dimensions of cells ((202-1/204-1), (202-3/204-1), (202-7/204-1)), all the dimensions of all the cells adjacent to cells ((202-1/204-1), (202-3/204-1), (202-7/204-1)) may remain unchanged. In another example, as illustrated in FIG. 3A, in which the height of cells ((202-1/204-1), (202-3/204-1), (202-7/204-1)) has been increased to reveal all of the hidden information comprised in those cells, some of the cells adjacent to the cells ((202-1/204-1), (202-3/204-1), (202-7/204-1)), as cells (202-2/204-1), (202-3/204-1) and (202-6/204/1) have unchanged widths and heights, some of the cells adjacent to the cells ((202-1/204-1), (202-3/204-1), (202-7/204-1)) as cells (202-1/204-2), (202-3/204-2) and (202-7/204-2) have unchanged widths and increased heights.

In some embodiments, after the enhancing scroll signal terminates, the enlarged at least one cell may return to its original dimensions, or the size of all information contained within the at least one cell may return to its original size. The return to the original dimensions of at least one cell or the return to the original size of a piece of information included in at least one cell can occur independently of the fact that all the information hidden in at least one cell has been revealed. For example, in FIG. 3A, once the enhancing scroll signal is completed, the heights of cells ((202-1/204-1), (202-3/204-1), (202-7/204-1)) may return to their original values, and as shown in FIG. 3B, once the enhancing scroll signal is completed, the sizes of the pieces of information comprised in cells ((202-1/204-1), (202-3/204-1), (202-7/204-1)) may return to their original associated sizes. Thus, the display returns to the appearance as illustrated in FIG. 2.

In some embodiments, the enhancing scroll signal may cause a font size to change. For example, as illustrated in FIG. 3B, during the process of reducing the size of the texts comprised in cells ((202-1/204-1), (202-3/204-1)) the font size of the texts has been reduced. Further, in some embodiments, a minimum font size may be set and if, after reducing the font size to the minimum font size, all of the information included in the at least one cell is not revealed, the at least one cell may be enlarged. For example, referring to FIG. 3B, the font size of cell (202-3/204-1) may be less than a minimum font size, revealing the hidden information of cell (202-3/204-1) could have been done by first reducing the font size to the minimum font size, and then increasing the height of cell (202-3/204-1) so that all the text included in that cell is displayed with the minimum font size.

In some embodiments, revealing the hidden information may further include enlarging the at least one cell, and wrapping one or more lines of text contained within the at least one cell. For example, in FIG. 3A, the height of cells ((202-1/204-1), (202-3/204-1)) has been increased and the texts comprised in these cells are now entirely visible in a form where one or more line of these texts have been wrapped. In some embodiments, "wrapping" may involve a word processing or text-editing process or subroutine breaking lines of text, or lengthening lines of text, automatically, to display an increased amount of text within certain margins or boundaries, without requiring a user to manually move or edit the text. In the context of the disclosed embodiments, wrapping may cause the content of a cell to become more readily visible, or fully visible, when the dimensions of the cell are altered to yield additional space for displaying the content.

In some embodiments, the at least one processor lock the at least one cell in an enhanced form until an unlock signal is received. An unlock signal may refer to a signal generated upon reception of any type of user input related to the display. Examples of user input may include manipulating various controls on GUI components or performing a particular movement. For example, a swipe motion or a pinching in motion may result in the generation of an unlock signal. In some embodiments, a motion that is reversed from the enhancing motion may lead to the generation of a unlock signal. Examples of motion/reversed motion may include pinching in/pinching out or scrolling beyond an end of a table/scrolling toward an end of a table. In some embodiments repeating the enhancing motion when the at least one cell is an enhanced form may lead to the generation of an unlock signal. For example, if the enhancement movement corresponds to a double tap on a particular portion of the screen, a further double tap on the particular portion of the screen may lead to the generation of an unlock signal and trigger the restoration of an initial state in which the at least one cell includes more information than that displayed. In some other embodiments, locking the at least one cell in an enhanced form, may include locking the at least one cell only if all the hidden information comprised in the at least one cell is revealed.

In some embodiments, in a situation wherein the at least one cell is locked in an enhanced form, and the unlock signal is not the result of a motion capable to scroll the table horizontally or vertically, one or more scroll signals may be received for causing the table with the at least one cell in an enhanced form to scroll vertically or horizontally. Referring to FIG. 3A, once cells ((202-1/204-1), (202-3/204-1), (202-7/204-1)) are locked in their enhanced form, a vertical scrolling signal may be received to scroll vertically table 200 and present on the display 206 portions of table 200 that were not visible before, such as cell (202-7/204-1) in an enhanced form.

In some embodiments, a system may be configured to perform table navigation operations on a display. As discussed herein, the table may include rows and columns and at least one cell that contains more information than it presents. The system may comprise a memory storing instructions and at least one processor that executes the stored instructions to perform operations. Consistent with FIG. 1 described above, the at least one processor may receive a scroll signal for scrolling the table, wherein the scroll signal results from a motion of a user on the display. In response to a vertical component in the motion, the at least one processor may cause the table to scroll vertically. In response to a horizontal component in the motion, the at least one processor may cause the table to scroll horizontally. The at least one processor may receive an enhancing scroll signal resulting from an enhancing motion for revealing hidden information within the at least one cell on the table. In response to the enhancing scroll signal, the at least one processor may reveal at least a portion of the hidden information within the at least one cell.

Figure 4:
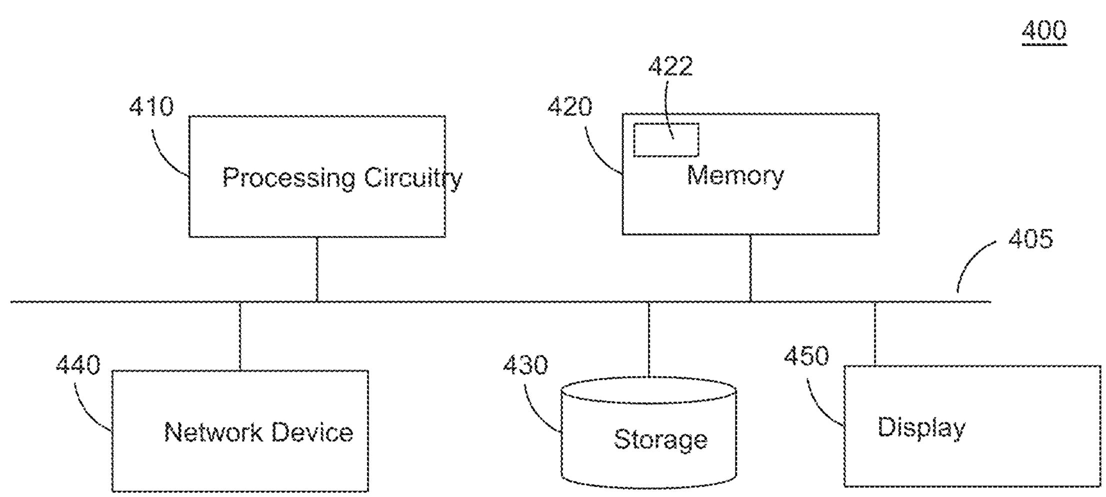
FIG. 4 is a block diagram of an exemplary computing device which may be employed in connection with embodiments of the present disclosure.

FIG. 4 is a block diagram of an exemplary computing device 1200 consistent with some embodiments. In some embodiments, computing device 400 may be similar in type and function to user device 420, discussed with respect to FIG. 5. As shown in FIG. 4, computing device 400 may include processing circuitry 410, such as, for example, a central processing unit (CPU). In some embodiments, the processing circuitry 410 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 410 may be coupled via a bus 405 to a memory 420.

The memory 420 may further include a memory portion 422 that may contain instructions that when executed by the processing circuitry 410, may perform the method described in more detail herein. The memory 420 may be further used as a working scratch pad for the processing circuitry 410, a temporary storage, and others, as the case may be. The memory 420 may be a volatile memory such as, but not limited to, random access memory (RAM), or non-volatile memory (NVM), such as, but not limited to, flash memory. The processing circuitry 410 may be further connected to a network device 440, such as a network interface card, for providing connectivity between the computing device 400 and a network, such as a network 410, discussed in more detail with respect to FIG. 5 below. The processing circuitry 410 may be further coupled with a storage device 430. The storage device 430 may be used for the purpose of storing single data type column-oriented data structures, data elements associated with the data structures, or any other data structures. While illustrated in FIG. 4 as a single device, it is to be understood that storage device 430 may include multiple devices either collocated or distributed.

The processing circuitry 410 and/or the memory 420 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 400 may include one or more input and output devices (not shown in figure). Computing device may also include a display 450, such as a touchscreen display or other display types discussed herein.

Figure 5:
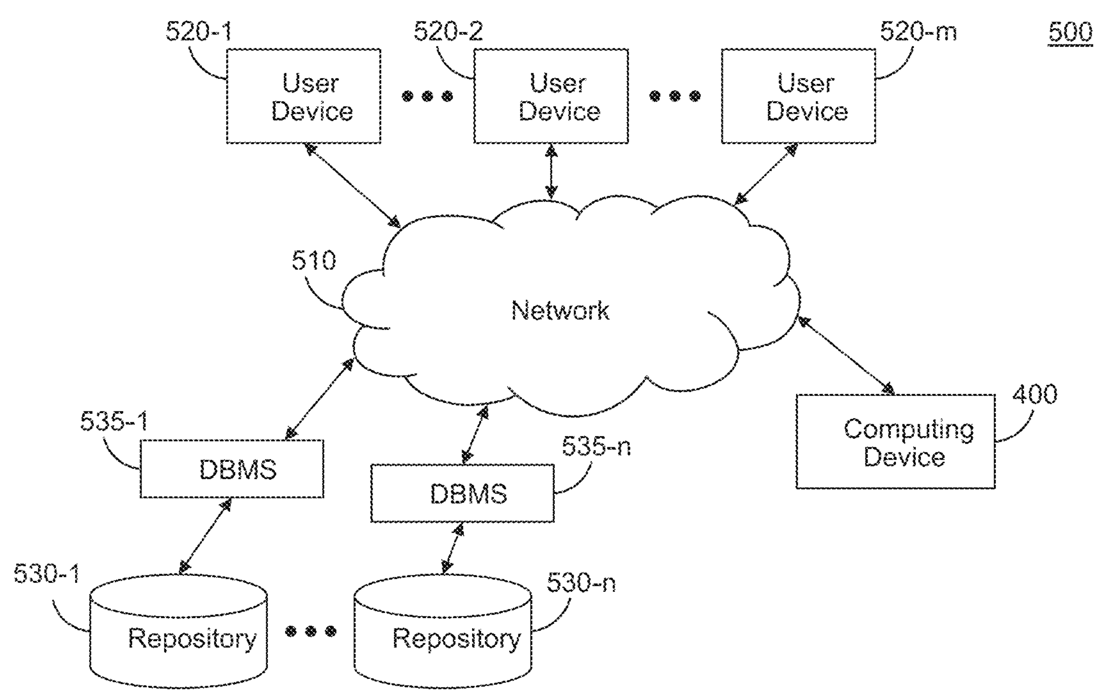
FIG. 5 is a block diagram of an exemplary computing architecture for collaborative work systems, consistent with embodiments of the present disclosure.

FIG. 5 is a block diagram of computing architecture 500 that may be used in connection with various disclosed embodiments. The computing device 400, as described in connection with FIG. 4, may be coupled to network 510. The network 510 may enable communication between different elements that may be communicatively coupled with the computing device 400, as further described below. The network 510 may include the Internet, the world-wide-web (WWW), a local area network (LAN), a wide area network (WAN), a metro area network (MAN), and other networks capable of enabling communication between the elements of the computing architecture 500. In some disclosed embodiments, the computing device 400 may be a server deployed in a cloud computing environment.

One or more user devices 520-1 through user device **520-*m*, where 'm' in an integer equal to or greater than 1, referred to individually as user device 520 and collectively as user devices 520, may be communicatively coupled with the computing device 400 via the network 510. A user device 520 may be for example, a smart phone, a mobile phone, a laptop, a tablet computer, a wearable computing device, a personal computer (PC), a smart television and the like. A user device 520 may be configured to send to and receive from the computing device 400** data and/or metadata associated with a variety of elements associated with single data type column-oriented data structures, such as columns, rows, cells, schemas, and the like.

One or more data repositories 530-1 through data repository **530-*n*, where 'n' in an integer equal to or greater than 1, referred to individually as data repository 530 and collectively as data repository 530, may be communicatively coupled with the computing device 400 via the network 510, or embedded within the computing device 400. Each data repository 530 may be communicatively connected to the network 510 through one or more database management services (DBMS) 535-1 through DBMS 535-*n*. The data repository 530 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 400**.

The embodiments disclosed herein are exemplary and any other means for performing and facilitating display navigation operations may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network."

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium containing instructions that, when executed, cause at least one processor to perform table navigation operations on a display, wherein the table comprises rows and columns and at least one cell that contains more information than presented on the display, the operations comprising:

receiving a scroll signal for scrolling the table, wherein the scroll signal results from a motion of a user on the display;

in response to a vertical component in the motion, causing the table to scroll vertically;

in response to a horizontal component in the motion, causing the table to scroll horizontally;

receiving an enhancing scroll signal resulting from an enhancing motion for revealing hidden information within the at least one cell on the table; and in response to the enhancing scroll signal, revealing at least a portion of the hidden information within the at least one cell.

2. The non-transitory computer-readable medium of claim 1, wherein revealing the hidden information is progressive, and a ratio between an amount of the information revealed and an amount of information that is initially hidden is proportional to a length of the enhancing motion.

3. The non-transitory computer-readable medium of claim 1, wherein the enhancing motion is different from a motion capable of scrolling the table horizontally or vertically.

4. The non-transitory computer-readable medium of claim 1, wherein the enhancing motion corresponds to a motion capable of scrolling the table horizontally or vertically, a result of the motion corresponds to at least one of:

revealing hidden information within the at least one cell on the table if the motion is performed on a predetermined portion of the display; or, causing the table to scroll horizontally or vertically if the motion is performed on a portion different from the predetermined portion of the display.

5. The non-transitory computer-readable medium of claim 1, wherein revealing the hidden information ceases after the enhancing motion terminates.

6. The non-transitory computer-readable medium of claim 1, wherein the hidden information is revealed for a predetermined time period.

7. The non-transitory computer-readable medium of claim 1, wherein the enhancing scroll signal is based on a scroll motion performed beyond an end of the table.

8. The non-transitory computer-readable medium of claim 7, wherein the at least one cell is located at a first end of the table or at a second end of the table opposite the first end.

9. The non-transitory computer-readable medium of claim 7, wherein the hidden information is revealed while the enhanced scroll motion is performed on a predetermined portion of the display.

10. The non-transitory computer-readable medium of claim 7, where the operations further comprise, if the scroll signal exceeds a threshold, causing both scrolling and a partial revealing of the hidden information.

11. The non-transitory computer-readable medium of claim 1, wherein revealing the hidden information includes at least one of:

enlarging the at least one cell in order to present all the information contained within the at least one cell; or modifying a size of all information contained within the at least one cell to enable presentation of all the information contained within the at least one cell without changing dimensions of the at least one cell.

12. The non-transitory computer-readable medium of claim 10, wherein at least one dimension of one or more cells adjacent to the at least one cell remains unchanged.

13. The non-transitory computer-readable medium of claim 10, wherein the enlarged at least one cell includes at least one of an increased height, an expansion in width, or an expansion in both height and width.

14. The non-transitory computer-readable medium of claim 10, wherein, after the enhancing scroll signal terminates, the enlarged at least one cell returns to its original dimensions, or the size of all information contained within the at least one cell returns to its original size.

15. The non-transitory computer-readable medium of claim 10, wherein the enhancing scroll signal causes a font size to change.

16. The non-transitory computer-readable medium of claim 10, wherein revealing the hidden information further includes:

enlarging the at least one cell; and wrapping one or more lines of text contained within the at least one cell.

17. The non-transitory computer-readable medium of claim 1, wherein the operations further include locking the at least one cell in an enhanced form until an unlock signal is received.

18. A system for performing table navigation operations on a display, wherein the table comprises rows and columns and at least one cell that contains more information than it presents, the system comprising:

a memory storing instructions; and at least one processor that executes the stored instructions to:

receive a scroll signal for scrolling the table, wherein the scroll signal results from a motion of a user on the display;

in response to a vertical component in the motion, cause the table to scroll vertically;

in response to a horizontal component in the motion, cause the table to scroll horizontally;

receive an enhancing scroll signal resulting from an enhancing motion for revealing hidden information within the at least one cell on the table; and in response to the enhancing scroll signal, reveal at least a portion of the hidden information within the at least one cell.

19. The system of claim 18, wherein revealing the hidden information includes at least one of:

enlarging the at least one cell in order to present all the information contained within the at least one cell; or modifying a size of all information contained within the at least one cell to enable presentation of all the information contained within the at least one cell without changing dimensions of the at least one cell.

20. A method for performing table navigation operations on a display, wherein the table comprises rows and columns and at least one cell that contains more information than it presents, the method comprising:

receiving a scroll signal for scrolling the table, wherein the scroll signal results from a motion of a user on the display;

in response to a vertical component in the motion, causing the table to scroll vertically;

in response to a horizontal component in the motion, causing the table to scroll horizontally;

receiving an enhancing scroll signal resulting from an enhancing motion for revealing hidden information within the at least one cell on the table; and in response to the enhancing scroll signal, revealing at least a portion of the hidden information within the at least one cell.

* * * * *